United States Patent Office 3,462,347
Patented Aug. 19, 1969

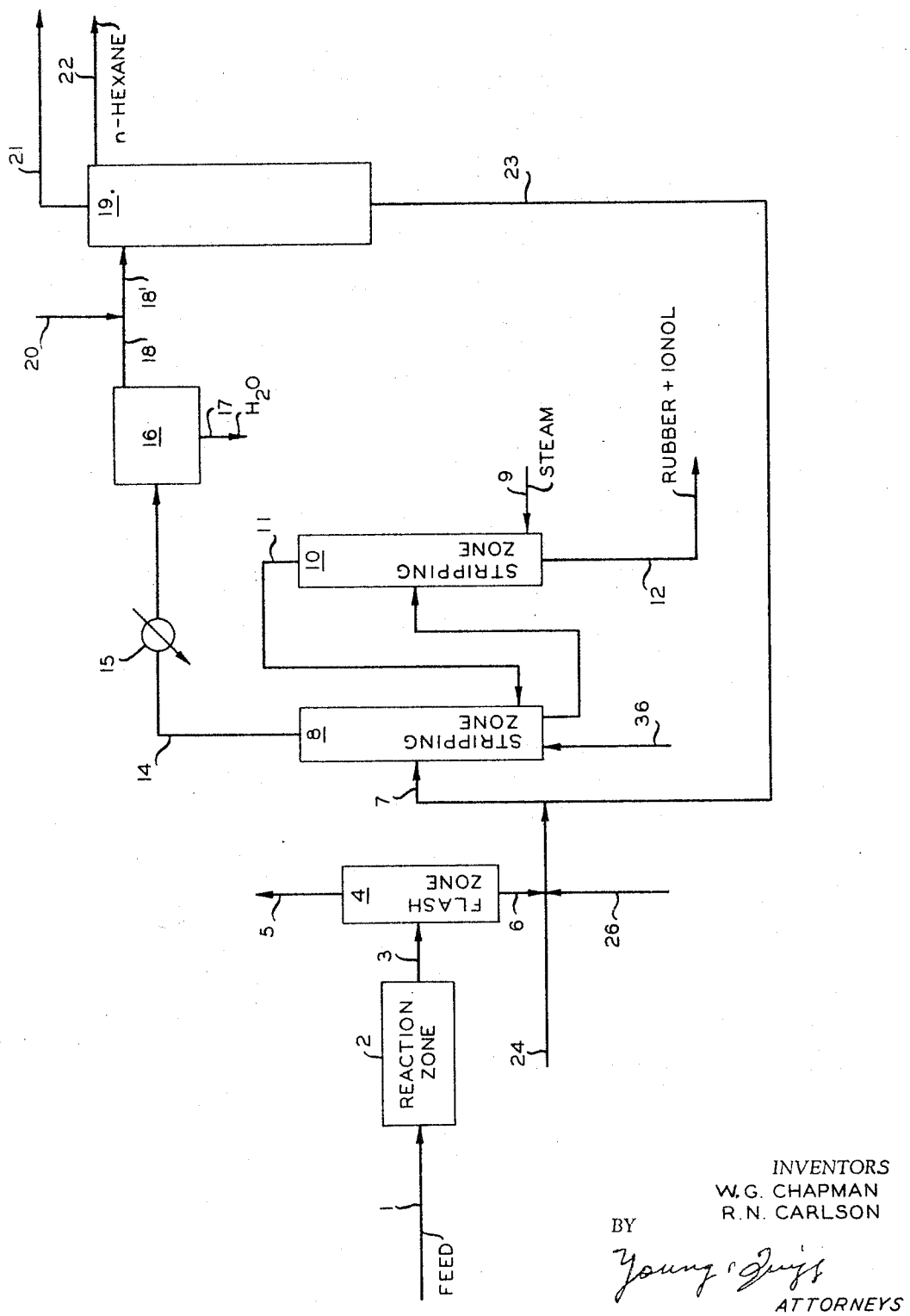

3,462,347
SOLVENT PURIFICATION AND RECOVERY BY STRIPPING AND DISTILLATION
Weldin G. Chapman and Rollin N. Carlson, Borger, Tex., assignors to Phillips Petroleum Company, a corporation of Delaware
Filed Dec. 16, 1966, Ser. No. 602,211
Int. Cl. B01d 3/34; C23f 14/00
U.S. Cl. 203—6                                                    6 Claims

ABSTRACT OF THE DISCLOSURE

In recovery of solvents employed in a chemical process, for example, in the production of synthetic rubber from butadiene and styrene employing a solvent, for example, normal hexane and a catalyst such as n-butyl lithium, in the distillation of the solvent, there is formed a bottom containing heavies, especially heavies which tend to foul the equipment. An increase in bottoms take-off to avoid such fouling is accomplished following which these bottoms are passed to a point in the rubber production operation which is beyond the reaction zone so as to avoid contamination in the reaction zone, yet to treat effectively the increased take-off bottoms in existing equipment while maintaining design capacity. The bottoms from the solvent distillation zone are introduced into the stripping zone wherein water and solvent are stripped from the reaction effluent.

---

This invention relates to the purification of solvent employed in a chemical process. More particularly, it relates to the recovery of a solvent employed in a process wherein the solvent is present in a reactor effluent stream containing materials which may foul equipment if unduly concentrated in the solvent. Further, it relates to the purification of a solvent in a catalytic process, e.g., a polymerization process, wherein the reactor effluent contains matter which must be removed from the solvent prior to its return for reuse in the reactor if catalytic contamination is to be avoided, whether such material is contained in said effluent as it leaves reactor or is added to it for its further processing, as an antioxidant which may be added.

In one of its concepts, the invention provides a process wherein the solvent as it becomes concentrated in liquid phase, by distillation to recover a purified vapor phase, is maintained fluent or sufficiently liquid to be transferable without fouling difficulties and is then passed to a point in the overall system at which it is combined with a stream from which ultimately a product is recovered also as a liquid. In one embodiment of the invention, rubber producing polymerization reaction effluent containing a solvent, e.g., hexane, is distilled to produce at least one vapor stream, which is recovered as purified solvent suited for reuse, and a liquid bottoms which contains impurities, for example, antioxidant employed during the processing of the reactor effluent which preferably should not be recycled to the reaction with recovered solvent, and the liquid bottoms is passed into admixture with reactor effluent prior to steam stripping said effluent to recover a concentrated rubber and antioxidant containing product therefrom, the admixture being effected in a now preferred form after flash distillation of the reactor effluent.

We have found that in certain operations in equipment designed to process to recover solvent for reuse in rubber production there occurs in the kettle of the distillation column a build-up of rubber, including heavies, and that to avoid fouling, as of steam coils used in the distillation, kettle take-off had to be increased considerably. Instead, a 5–10 percent increase in take-off, based on the column feed, was necessary. This build-up in solvent rejected, i.e., solvent to be returned for refining, was, economically speaking, extremely expensive. Thus, to prevent coil fouling and other disadvantages or loss, the increased take-off was admixed with the purified or dry solvent product stream albeit the cost of catalyst was increased due to contamination thereof. This, however, was taken as the lesser of costs when returning the solvent to refining in the refinery was considered. The cost of refining was of the order of several hundred thousand dollars per year as against a minor part of one hundred thousand dollars a year. Thus, the plant could be kept running at design capacity albeit at a real or palpable cost above that which it was thought absolutely necessary.

We then can see that the solvent recovery operation could be effected so as to continue to recover the increased kettle take-off by admixing the bottoms stream from the drying or distillation column kettle with the stream of reactor effluent prior to steam strippers from which the product rubber in solution is obtained. In a specific operation, the bottoms are admixed with the flashed reactor effluent which essentially contains in the process considered here, which is one for the production of rubber from butadiene and styrene employing a butyl lithium catalyst, butylenes, some acetylenes, styrene impurities, solvent and polymer. The table shows the relative proportions of the respective streams of the drawing which are given to illustrate the nature and extent of the operation of the invention as applied to the given example of said table. It will be understood by one skilled in the art in possession of this disclosure, having studied the same, that other operations upon various feeds from other reactions are within the scope of at least the broader concepts of the invention. The processing of streams to which may be added such processing aids or antioxidants or preservatives is enhanced according to this invention, especially in those cases as in the specific embodiment given herein wherein the processing aid is advantageously incorporated into the product.

It is an object of this invention to recover and purify solvent employed in the chemical reatcion or process. It is another object of the invention to recover and to purify solvent employed in the chemical reaction or process. It is another object of the invention to increase the throughput of a given process equipment for recovering a solvent. A further object of the invention is to modify and to improve the operation of a solvent recovery system in which a product which is subject to degradation or oxidation is also recovered, as from said solvent, and there is employed an antidegradation agent or antioxidant in said operation. Still another object of the invention is the provision of a process for the recovery of a rubber product from the reaction effluent by steam stripping or other heat involving process in which an antidegradation agent is employed, which for best results must not be fed to the reaction zone in which it poisons pro tanto the catalyst. It is a further object still to recover from a butadiene-styrene polymerization effluent the solvent employed, e.g., hexane, and to eliminate increasingly from the solvent the rubber along with said agent, e.g., Ionol (2,6-ditertbutyl-4-methyl phenol). A still further object of the invention is to recover in such a process as herein set forth as part of the product the antidegradation or other agent.

Other concepts, objects and the several advantages of the invention are apparent from a study of this disclosure, the drawing and the appended claims.

According to the present invention, a reaction effluent is treated to recover therefrom a reaction product therein contained in a solvent which is to be purified for reuse, as in a catalytic process, the said effluent being subjected to an operation in which the solvent is largely separated therefrom, the solvent unavoidably taking therewith, say, an antidegradation agent added to said effluent to protect the reaction product therein while the solvent is being separated therefrom, and, as can be the case, some product also, the process comprising the steps of treating said separated solvent to recover therefrom a vapor stream of substantially purified solvent and a liquid product containing said agent and any said product and admixing said liquid product with said effluent, thus recovering said agent and any said product together with that, major, portion of product which is recovered when said solvent is separated.

The invention is now described more fully in connection with the specific example to which reference has been made and in connection with the drawing. Kindly refer to Table I for compositions of the stream to be discussed.

and the solvent which did not flash overhead are passed by 7 to stripping zone 8 to which steam is passed by 9, stripping zone 10 and steam conduit 11. Recycle water from polymer recovery was added to stripping zone 8 by conduit 36. In the stripping zones 8 and 10, substantially all, but not all, of the solvent is stripped from the feed entering at 7. There is obtained at 12 the product containing some solvent, the catalyst, antioxidant, some fatty acid shortstop, the polymer, water and tamol (sodium salt of condensed naphthalene sulfonic acids used as a dispersing agent).

Overhead from stripping zone 8 passes by 14, condenser 15 to water settler 16, from which settled water is removed at 17. This water passes to drain. Supernatant solvent, i.e., hexane, is passed by 18 to distillation column 19. Makeup solvent is added at 20. Overhead 21 from the

TABLE I

| Stream No | 1 | 3 | 5 | 6 | 23 | 24 | 26 | 7 |
|---|---|---|---|---|---|---|---|---|
| Component | Reactor Charge | Reactor Effluent | Flash Overhead | Flash Bottoms | Fractionator Bottoms Recycle | Short Stop | Anti-Oxidant Solution | Stripper Feed |
| Butadiene | 163,608 | | | | | | | |
| Butylenes | 13,454 | 13,454 | 12,022 | 1,432 | 12 | | | 1,444 |
| Acetylenes | 17 | 17 | 14 | 3 | | | | 3 |
| Styrene | 54,544 | | | | | | | |
| Styrene Impurities | 339 | 339 | | 339 | 734 | | | 1,073 |
| 85% n-Hexane | 1,530,249 | 1,530,249 | 381,981 | 1,148,268 | 51,396 | | 3,268 | 1,202,932 |
| Butyl Lithium | 384 | 384 | | 384 | | | | 384 |
| Anti-Oxidant | | | | | 348 | | 2,075 | 2,423 |
| Fatty Acid | | | | | | 1,091 | | 1,091 |
| Polymer | | 218,152 | | 218,152 | 4,500 | | | 222,652 |
| Water | | | | | | | | |
| Total: | | | | | | | | |
| Lb./SD | 1,762,595 | 1,762,595 | 394,017 | 1,368,578 | 56,990 | 1,091 | 5,343 | 1,432,002 |
| Gal./SD | 349,056 | 349,056 | 73,648 | 268,338 | 11,210 | | 1,110 | 287,537 |

| Stream No | 14 | 9 | 17 | 20 | 21 | 22 | 12 | 36 |
|---|---|---|---|---|---|---|---|---|
| Component | Stripper Overhead | Stripping Steam | Decanter Water To Drain | Solvent Make-Up | Fractionator Overhead | Fractionator Product | Second Stripper Bottoms | Recycle Water From Polymer Recovery |
| Butadiene | | | | | | | | |
| Butylenes | 1,444 | | | | 648 | 748 | | |
| Acetylenes | 3 | | | | | | | |
| Styrene | | | | | | | | |
| Styrene Impurities | 1,073 | | | | 289 | 50 | | |
| 85% n-Hexane | 1,200,476 | | | 22,587 | 14,795 | 1,156,872 | 2,315 | |
| Butyl Lithium | | | | | | | 384 | |
| Anti-Oxidant | 110 | | | | | | 2,073 | |
| Fatty Acid | | | | | | | 2,864 | 1,773 |
| Polymer | 4,500 | | | | | | 218,152 | |
| Water | 92,382 | 407,772 | 91,630 | 16 | 768 | | 2,851,610 | 2,535,781 |
| Total: | | | | | | | | |
| Lb./SD | 1,295,488 | 407,772 | 91,630 | 22,603 | 16,536 | 1,157,670 | 3,077,942 | 2,537,989 |
| Gal./SD | | | 11,175 | 4,226 | | 231,237 | 387,180 | 316,237 |

Reference is made to application Ser. No. 421,158, filed Dec. 24, 1964, which describes and claims a method for the distillation of a feed material containing at least two vaporizable components and a relatively non-vaporizable component which comprises feeding said material to an upper portion of a distillation column, taking an overhead vaporous stream from said column containing substantially all of one of said two vaporizale components and a portion of at least one other of said vaporizable components, from an intermediate portion of said column below the feed to said column drawing off a vaporous stream of said at least one other of said vaporizable components, and withdrawing from the bottom of said column a liquid stream containing said relatively non-vaporizable component. Its disclosure is incorporated herein by reference.

Referring now to the drawing, a feed 1 containing butadiene, butylenes, styrene, solvent and n-butyl lithium, as well as some impurities such as acetylenes and styrene impurities, is fed to reaction zone 2 in which the usual reaction to form rubbery polymer ensues. The reactor effluent 3 which contains butylenes, solvent and polymer as well as catalyst and impurities is passed to flash zone 4 from which the overhead 5 containing butylenes and some solvent is taken off. Flash zone bottoms 6 containing butylenes, styrene impurities, catalyst, the polymer, column contains butylene and solvent and water. Substantially pure sidestream of hexane is taken off at 22. The bottoms 23 contains styrene impurities, some solvent, the antioxidant added as later described, and some polymer. These bottoms, according to the invention, are passed to admixture with flash zone bottoms prior to introducing the same to stripping zone 8. The antioxidant and rubber in stream 23 is recovered at 12 as part of the rubber product containing stream. Also added to flash zone bottoms prior to their introduction to stripping zone 8 are fatty acid shortstop and antioxidant solution which in Table II are 24 and 26, respectively.

Operating conditions for this process for producing rubber from butadiene and styrene using a butyl lithium catalyst are given in Table II.

TABLE II.—OPERATING CONDITIONS

| Operating Unit | No. | Temperature, °F. | Pressure, p.s.i.a. |
|---|---|---|---|
| Reaction Zone | 2 | 130-230 | 46 |
| Flash Zone | 4 | 174 | 20 |
| Stripping Zone | 8 | 160 | 17 |
| Stripping Zone | 10 | 228 | 20 |
| Steam to Stripping Zone 10 | 9 | 365 | 165 |
| Condenser | 15 | | |
| Inlet water | | 85 | |
| Outlet water | | 105 | |
| Decanter | 16 | 120 | |
| Solvent Column | 19 | | |
| Bottom | | 178 | 20 |
| Top | | 166 | 15 |

Thus, according to the invention in the embodiment just described, the 2,6-ditertiarylbutyl-4-methyl phenol antioxidant, as well as rubber, recovered as bottoms from distillation zone 19 are advantageously passed through the stripping zones and recovered at 12 in the alternate product. A substantially constant amount of solvent is recycled to permit the taking of bottoms from the kettle of the distillation zone which will not foul the equipment nor poison the catalyst as earlier discussed herein.

It will be evident to one skilled in the art of distillation having studied this disclosure, the drawing and the claims that the invention being one of physical nature has application to a wide variety of distillable mixtures. There is ever-pressing need, indeed, increasingly so, for more economically designed structures or operations in which large quantities of used materials, such as solvents, must be purified for reuse to meet the ever-increasing competition which our free enterprise economy demands. The present invention, in its various particulars or aspects, provides a unitary combination operation not only for the dehydration of the solvent but also for the recovery therefrom simultaneously of the additive, antioxidant, or shortstops or other agent which must be used before the product can be separated from the reaction mass.

Among the solvents to which this invention can be applied are included benzene, toluene, cyclohexane, methylcyclohexane, xylene, n-butane, n-heptane, isooctane, and the like. More generally, the solvent or diluent is selected from hydrocarbons, e.g., paraffins, cycloparaffins and aromatics containing, say, from 4 to 10 carbons per molecule.

While organo compounds of various alkali metals can be employed in carrying out the polymerization which results in an effluent such as described in connection with the embodiment illustrated in the drawing, best results are usually obtained with organo lithium compounds. Organo compounds of the otehr alkali metals can also be used.

Further, monomers which can be employed in the preparation of polymers are the conjugated dienes containing from 4 to 12 carbon atoms, preferably 4 to 8 carbon atoms, such as 1,3-butadiene, isoprene, piperylene, methylpentadiene, phenylbutadiene, 3,4-dimethyl-1,3-hexadiene, 4,5-diethyl-1,3-octadiene, etc. In addition, conjugated dienes containing reactive substituents along the chain can also be employed, for example, halogenated dienes such as chloroprene, fluoroprene, etc. In addition to styrene, aryl-substituted olefins such as alkyl styrenes, p-methoxy styrenes, vinyl naphthalene, vinyl toluene, and the like, and heterocyclic nitrogen-containing monomers such as pyridine and quinoline derivatives can be used.

The invention set forth and described herein is not limited to the exemplifications given here. The concept of the invention is not in the materials employed, but rather in the manner in which when the effluent has been obtained the solvent is recovered by way of the taking off of a rather liquid kettle bottoms and cycling the same to the stripping zone either directly or in admixture with the flash zone bottoms, as described.

In the embodiment described in connection with the drawing, the column for drying hexane and removing heavy poisons was designed for a feed of approximately 300,000 gallons per day of wet hexane, an overhead take-off of 1-5 percent with all moisture going over, a dry product taken off as a side stream draw-off, and a kettle reject of one percent of the column feed containing all the heavy poisons. When operated with only one percent of the feed taken off as bottoms product however, the concentration of rubber fines and heavy solubles increased to such an extent that the reboiler tubes became quickly fouled. By increasing the bottoms draw-off to nearly 5 percent of the feed, the rubber and heavies concentration was reduced to a low level and no fouling problem was encountered. The increased amount of bottoms product is recycled to the stripper feed for recovery of the rubber fines and anti-oxidant in accordance with this invention.

A patent related to the general overall production of butadiene-styrene rubber employing butyl lithium as a catalyst is U.S. 2,975,160 to Robert P. Zelinski, issued Mar. 14, 1961. The disclosure of said patent is incorporated herein by reference.

Reasonable variation and modification are possible within the scope of the foregoing disclosure, the drawing and appended claims, the essence of which is that in the recovery of solvent employed in a chemical reaction wherein the solvent is distilled forming a bottoms containing heavies, especially heavies which may tend to foul equipment, the bottoms are taken off including sufficient solvent to avoid such fouling and passed to an upstream point following the reaction in the operation such that heavies or product, or both, are recovered as a part of the product of the operation.

We claim:

1. A method in which a reaction effluent containing solvent and reaction product as well as other matter which must be removed from the solvent prior to its reuse as to protect any catalyst and which will be in the bottoms when the solvent is distilled prior to reuse is treated to recover solvent and product therefrom, the steps of stripping solvent in substantial quantity from said product, then subjecting the solvent thus obtained to distillation to recover purified solvent as a vapor and to recover bottoms containing said matter and sufficient solvent to maintain said recovered bottoms as a liquid and thus to avoid fouling of the distillation and passing said bottoms containing said solvent and said matter to said stripping without return to said reaction.

2. A method according to claim 1 wherein the reaction effluent contains a rubber, a hydrocarbon solvent, the stripping of solvent from the reaction effluent is effected in the presence of an antioxidant and said bottoms contain said antioxidant.

3. A method according to claim 2 wherein the reaction effluent is from a polymerization zone in which a rubber product is produced, the effluent is subjected to conditions of flashing to remove a portion of solvent to produce a liquid flashed reactant effluent, the said bottoms are combined with the liquid remaining after said flashing and the combined streams are passed to stripping.

4. A method according to claim 3 wherein butadiene-styrene rubber product is formed, an antioxidant is added to the flashed liquid reaction effluent, said bottoms are added to said flashed liquid effluent and said flashed liquid effluent and said bottoms now combined are stripped to recover said product.

5. A method according to claim 1 wherein a reaction zone effluent is flashed to remove solvent therefrom, the liquid remaining is combined with said bottoms and stripped in a stripping zone from which there is obtained an overhead containing some product and some said matter, and the product recovered from the stripping zone contains said matter and said product taken overhead from said stripping zone.

6. A method according to claim 3 wherein 2,6-ditertiarybutyl-4-methyl phenol is employed as an antioxidation agent to protect the product while solvent is being stripped therefrom in said stripping zone.

References Cited

UNITED STATES PATENTS

| | | | |
|---|---|---|---|
| 2,615,010 | 10/1952 | Troyan | 203—79 |
| 2,676,950 | 4/1954 | Sparks et al. | 260—45.95 |
| 2,927,065 | 3/1960 | Gerlicher et al. | 203—79 |

(Other references on following page)

UNITED STATES PATENTS

| | | | |
|---|---|---|---|
| 3,151,047 | 9/1964 | Moon et al. | 203—82 |
| 3,190,868 | 6/1965 | Mitacek et al. | 260—94.7 |
| 3,247,176 | 4/1966 | Veal | 260—94.7 |
| 3,250,313 | 5/1966 | Irven | 260—94.7 |
| 3,280,091 | 10/1966 | Dance | 203—88 |
| 3,326,781 | 6/1967 | Wilson | 260—94.7 |

WILBUR L. BASCOMB, Jr., Primary Examiner

U.S. Cl. X.R.

203—75, 76, 78, 79, 82, 83, 84, 85, 88; 260—45.95, 94.7, 94.8, 666